US011358307B2

(12) United States Patent
Marengo

(10) Patent No.: US 11,358,307 B2
(45) Date of Patent: Jun. 14, 2022

(54) METHOD FOR MANUFACTURING A COMPOSITE COMPONENT

(71) Applicant: ROLLS-ROYCE PLC, London (GB)

(72) Inventor: Giovanni Antonio Marengo, Derby (GB)

(73) Assignee: ROLLS-ROYCE PLC, London (GB)

( * ) Notice: Subject to any disclaimer, the term of this patent is extended or adjusted under 35 U.S.C. 154(b) by 184 days.

(21) Appl. No.: 16/090,963

(22) PCT Filed: Mar. 28, 2017

(86) PCT No.: PCT/GB2017/050858
§ 371 (c)(1),
(2) Date: Oct. 3, 2018

(87) PCT Pub. No.: WO2017/174961
PCT Pub. Date: Oct. 12, 2017

(65) Prior Publication Data
US 2019/0118411 A1    Apr. 25, 2019

(30) Foreign Application Priority Data
Apr. 6, 2016 (GB) ...................................... 1605888

(51) Int. Cl.
*B29B 11/16* (2006.01)
*B29C 70/34* (2006.01)
(Continued)

(52) U.S. Cl.
CPC .............. *B29B 11/16* (2013.01); *B29C 70/34* (2013.01); *B29D 99/0025* (2013.01);
(Continued)

(58) Field of Classification Search
CPC ........ B29C 70/30; B29C 70/34; B29C 70/38; F01D 25/243; F05D 2220/32;
(Continued)

(56) References Cited

U.S. PATENT DOCUMENTS 4,622,091 A * 11/1986 Letterman ............. B29B 15/105
156/286
5,348,602 A    9/1994 Makarenko et al.
(Continued)

FOREIGN PATENT DOCUMENTS

CN          1910026 A    2/2007
CN        102478039 A    5/2012
(Continued)

OTHER PUBLICATIONS

Mar. 31, 2020—(CN) Office Action—201780022326.6 with trans.
(Continued)

*Primary Examiner* — Francisco W Tschen
*Assistant Examiner* — Elisa H Vera
(74) *Attorney, Agent, or Firm* — Banner & Witcoff, Ltd.

(57) ABSTRACT

There is disclosed a method of manufacturing a composite component comprising a main body and an integral flange, the method comprising applying fibre-reinforcement material on a tool having a main body portion and a flange-forming portion to provide a pre-form comprising a body region and a longitudinally adjacent flange region. The pre-form extends generally longitudinally between two longitudinal ends; and a trailing ply of the pre-form extends generally longitudinally between the longitudinal end closest to the flange region and an inner ply end located in the flange region or partway into the body region. Relative movement between the flange-forming portion and the main body portion causes sliding movement between the trailing ply and the flange-forming portion during a flange forming operation, thereby causing a tension force in at least the flange region of the pre-form of during forming of the flange.

18 Claims, 7 Drawing Sheets

(51) Int. Cl.
  *B29D 99/00* (2010.01)
  *F01D 25/24* (2006.01)
  *B29K 105/06* (2006.01)
  *B29L 31/08* (2006.01)

(52) U.S. Cl.
  CPC ........ *F01D 25/243* (2013.01); *B29K 2105/06* (2013.01); *B29L 2031/08* (2013.01); *F05D 2220/32* (2013.01)

(58) Field of Classification Search
  CPC . B29D 99/0025; B29B 11/16; B29K 2105/06; B29L 2031/08
  See application file for complete search history.

(56) References Cited

U.S. PATENT DOCUMENTS

| | | | |
|---|---|---|---|
| 9,539,769 | B2 | 1/2017 | Bremmer et al. |
| 2002/0006333 | A1* | 1/2002 | Fournier .................. F02K 1/70 416/93 R |
| 2009/0098337 | A1 | 4/2009 | Xie et al. |
| 2012/0312459 | A1 | 12/2012 | De Mattia |
| 2013/0095284 | A1 | 4/2013 | Bremmer et al. |
| 2013/0266431 | A1* | 10/2013 | Moram ................ B29C 70/342 415/182.1 |
| 2015/0047151 | A1* | 2/2015 | Masini .................... B29C 70/30 16/225 |
| 2015/0061187 | A1 | 3/2015 | Estragnat |
| 2016/0201478 | A1* | 7/2016 | Kray ....................... F01D 5/282 415/200 |
| 2016/0207266 | A1* | 7/2016 | Koncz .................... B29C 70/54 |

FOREIGN PATENT DOCUMENTS

| | | |
|---|---|---|
| CN | 103302868 A | 9/2013 |
| CN | 103338914 A | 10/2013 |
| CN | 103402739 A | 11/2013 |
| CN | 103660309 A | 3/2014 |
| CN | 104416918 A | 3/2015 |
| CN | 104822515 A | 8/2015 |
| GB | 2486231 A | 6/2012 |
| WO | 2014/058545 A1 | 4/2014 |

OTHER PUBLICATIONS

United Kingdom Search Report for Application No. GB1605888.5 dated Sep. 15, 2016.
International Search Report and Written Opinion for PCT/GB2017/050858, dated Jul. 6, 2017.
Dec. 15, 2021—(CN) Office Action—App 2020109403427—Eng Trans.

* cited by examiner

METHOD FOR MANUFACTURING A COMPOSITE COMPONENT

CROSS-REFERENCE TO RELATED APPLICATIONS

The present application is a U.S. National Phase filing of International Application No. PCT/GB2017/050858, filed on Mar. 28, 2017, and claiming priority to United Kingdom Patent Application No. 1605888.5 filed Apr. 6, 2016, and the present application claims priority to and the benefit of all the above-identified applications, which are all incorporated by reference herein in their entireties.

FIELD OF THE INVENTION

The present disclosure concerns a method of manufacturing a composite component having a main body and an integral flange.

BACKGROUND

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

It is frequently desirable to manufacture a component with a flange, such as an annular flange on a casing for a gas turbine, or the sides of a spar for a wing. Where such components are to be manufactured from composite materials, the formation of the flange can pose an engineering problem. For example, it may be difficult to lay-up composite material on a flanged mould, in particular in the region of bends between the main portion of the mould and the flange, which may be hard to access.

One known method of manufacturing a composite component with an integral flange is disclosed in GB2486231, which discloses an annular mould for a composite pre-form having a first portion and a movable second portion. After laying up plies of unidirectional composite tape on the mould, the mould and pre-form are heated in an autoclave and the movable second portion is actuated to move radially outward, thereby deforming an end region of the pre-form overlaying the movable second portion of the tool to form the flange.

In GB2486231, the flange abruptly extends away from the cylindrical region of the pre-form so that the cross-section of a transition region between them appears relatively square. In other words, there is a high curvature bend between the cylindrical region and the flange. In GB2486231, the shape of the transition region is defined in part by a counteracting forming tool (or female forming tool) having a high curvature edge about which the flange is formed.

It may also be desirable to manufacture a composite component in which there is a relatively low curvature transition between a main region of the component and a flange. For example, a low curvature transition may reduce stress concentrations and improve the structural characteristics of the component. Where a flanged mould is used, the low curvature transition region can be defined on the mould. However, where a tool with a movable portion is used to form the flange, the low curvature transition region cannot be pre-defined on the lay-up surfaces of the tool, as the lay-up surfaces are substantially continuous in a lay-up configuration. Whilst a counteracting forming tool portion may be provided to define the profile of the transition region on an outer side of the pre-form, the applicant has found that the transition region of the formed component may not conform to the desired shape or may suffer from forming defects in this region, such as the formation of out-of-plane wrinkles in the alignment, and ply misalignment.

BRIEF SUMMARY

According to a first aspect there is provided a method of manufacturing a composite component comprising a main body and an integral flange, the method comprising: applying fibre-reinforcement material on a tool having a main body portion and a flange-forming portion to provide a pre-form comprising: a body region and a longitudinally adjacent flange region contiguous with the body region, the body region corresponding to the main body of the component and the flange region corresponding to the integral flange of the component; wherein the pre-form extends generally longitudinally between two longitudinal ends; and wherein a trailing ply of the pre-form extends generally longitudinally between the longitudinal end closest to the flange region and an inner ply end located in the flange region or partway into the body region; causing relative movement between the flange-forming portion and the main body portion so that the flange region of the pre-form deforms to form the flange of the component; wherein the relative movement between the flange-forming portion and the main body portion causes sliding movement between the trailing ply and the flange-forming portion, thereby causing a tension force in at least the flange region of the pre-form of during forming of the flange.

The trailing ply terminates at the inner ply end. The inner ply end may be located in the flange region or partway into the body region such that the inner ply end is spaced from the opposing longitudinal end of the pre-form. The fibre-reinforcement material of the pre-form terminates at the two longitudinal ends.

The tension force may be such that the inner ply end moves longitudinally relative an adjacent ply. The adjacent ply may be adjacent with respect to a thickness direction of the pre-form.

The fibre-reinforcement material may be applied so that the trailing ply has an orientation substantially aligned with the longitudinal direction. The fibre-reinforcement material may be applied so that the trailing ply has an orientation substantially perpendicular to a boundary between the body region and the flange region of the pre-form. The boundary between the body region and the flange region may be the line or region from which the flange region extends (or deflects or diverts) during forming to form the flange of the component. The boundary may substantially overlay a boundary between the flange-forming portion and the main body portion of the component. In other words, the trailing ply may have an orientation substantially aligned with the direction along which the flange region extends from the body region, and/or the direction along which the flange of the component extends from the main body.

The fibre-reinforcement material may be applied so that the trailing ply has an orientation substantially perpendicular to a boundary between the main body portion and the flange-forming portion of the tool.

The flange region may comprise a plurality of plies of fibre-reinforcement material arranged in ply layers, a base (or lower) ply layer of which is the closest of the plurality to the tool, and wherein the fibre-reinforcement material is applied so that the trailing ply at least partly forms the base ply layer.

Each ply layer may be one ply thick, but may comprise multiple plies forming the ply layer, such as laterally or longitudinally adjacent plies which together form a ply layer.

The flange region may comprise a plurality of plies of composite material arranged in ply layers, and the fibre-reinforcement material may be applied so that the trailing ply at least partly forms an intermediate ply layer of the flange region or an outermost ply layer of the flange region which is farthest from the tool. The trailing ply may have an outer ply end coterminous with the respective longitudinal end of the pre-form.

The flange region may extend from the body region to an opposing outer end of the flange-region. The trailing ply may extend generally longitudinally from the inner ply end, beyond the outer end of the flange region to the respective longitudinal end of the pre-form.

The thickness of the pre-form may reduce beyond the outer end of the flange region (i.e. the respective longitudinal end of the pre-form). The thickness of the pre-form in the flange region may be substantially constant up to the outer end of the flange region.

The thickness of the pre-form beyond the outer end of the flange region may be 50% or less than the maximum or average thickness of the flange region of the pre-form. There may be fewer than 10 plies of fibre-reinforcement material extending beyond the outer end of the flange region. There flange region may have a thickness of at least 10 plies up to its outer end. There may be a step change in pre-form thickness at the outer end of the flange region. Only the or each trailing ply may extend beyond the outer end of the flange region.

The trailing ply may extend generally longitudinally at least 20 mm beyond the outer end of the flange region. The trailing ply may extend generally longitudinally at least 30 mm, or at least 50 mm, or at least 100 mm beyond the outer end of the flange region. The trailing ply may have a total longitudinal extent of at least 200 mm, at least 250 mm or at least 300 mm.

There may be at least two trailing plies extending beyond the outer end of the flange region, including a first trailing ply extending a first distance beyond the outer end of the flange region, and a second trailing ply extending a greater second distance beyond the outer end of the flange region and over the first trailing ply to terminate at the respective longitudinal end of the pre-form, such that at least a portion of each trailing ply slides relative the flange-forming portion of the tool during a flange forming operation.

Each trailing ply may slide relative the flange-forming portion of the tool during forming to cause a tension force in each trailing ply, thereby causing tension in the flange region during forming. Each trailing ply may be in frictional sliding contact with the flange-forming portion of the tool, or with a release liner disposed over the flange-forming portion of the tool.

The method may further comprise removing composite material corresponding to the or each trailing ply which extends beyond the outer end of the respective flange region.

The method may further comprise removing composite material corresponding to an outer end of the flange region, for example, to trim a flange having a Z-shaped cross-section to have an L-shaped cross-section.

The composite component may have primary and secondary flanges at opposing longitudinal ends of the component. The tool may have respective primary and secondary flange-forming portions, and the pre-form may have primary and secondary flange regions and primary and secondary trailing plies. The primary and secondary trailing plies may not overlap (i.e. they may be at opposing ends of the pre-form. The respective inner ply ends of the primary and secondary trailing plies may be longitudinally spaced apart.

The or each flange-forming portion of the tool may have a lay-up surface that is substantially continuous with a lay-up surface of the main body portion of the tool in a lay-up configuration of the tool, and may have a side-surface which extends between the lay-up surfaces of the flange-forming portion and the main body portion of the tool in a forming configuration of the tool.

The direction of relative movement of the flange-forming portion and the main body portion of the tool may be parallel to the extent of the flange.

The composite component may be an annular or a partially annular component, such as a casing for a gas turbine engine. The main body portion and the flange-forming portion of the tool may be configured for relative radial movement, and the or each flange may be radially-extending.

The longitudinal direction may be an axial direction of the composite component.

According to a second aspect of the invention there is provided a method of manufacturing a composite component comprising a main body and an integral flange, the method comprising: applying fibre-reinforcement material on a tool having a main body portion and a flange-forming portion to provide a pre-form comprising: a body region and a longitudinally adjacent flange region contiguous with the body region, the body region corresponding to the main body of the component and the flange region corresponding to the integral flange of the component; wherein the pre-form extends generally longitudinally between two longitudinal ends; and wherein a trailing ply of the pre-form extends generally longitudinally between the longitudinal end closest to the flange region and an opposing ply end, the trailing ply having an orientation substantially aligned with the longitudinal direction; causing relative movement between the flange-forming portion and the main body portion so that the flange region of the pre-form deforms to form the flange of the component; wherein the relative movement of the flange-forming portion and the main body portion causes sliding movement between the trailing ply and the flange-forming portion, thereby causing a tension force in at least the flange region of the pre-form of during forming of the flange.

The opposing ply end of the trailing ply may be coterminous with the opposing longitudinal end of the pre-form (i.e. the trailing ply may extend the full longitudinal length of the pre-form). Alternatively, the opposing ply end may be located in the flange region or partway into the body region as described with respect to the first aspect of the invention, for example, such that the opposing ply end is spaced from the opposing longitudinal end of the pre-form.

According to a third aspect of the invention, there is provided a pre-form for a composite component having a main body and an integral flange, the pre-form comprising: a body region and a longitudinally adjacent flange region contiguous with the body region, the body region corresponding to the main body of the component and the flange region corresponding to the integral flange of the component; wherein the pre-form extends generally longitudinally between two longitudinal ends; and wherein a trailing ply of the pre-form extends generally longitudinally between the longitudinal end closest to the flange region and an inner ply end in the flange region or partway into the body region; wherein the pre-form is provided on a tool having a main body portion and a flange-forming portion; wherein the pre-form is configured so that, during a forming operation in which there is relative movement between the flange-forming portion and the main body portion, the flange region of the pre-form deforms to form the flange; and wherein the pre-form is configured so that relative movement of the flange-forming portion and the main body portion causes sliding movement between the trailing ply of the pre-form and the flange-forming portion of the tool, thereby producing a tension force in at least the flange region of the pre-form during forming of the flange.

The pre-form may have any of the features of the pre-form described above with respect to the first and second aspects of the invention.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Examples will now be described by way of example only, with reference to the Figures, in which.

DETAILED DESCRIPTION

Figure 1:
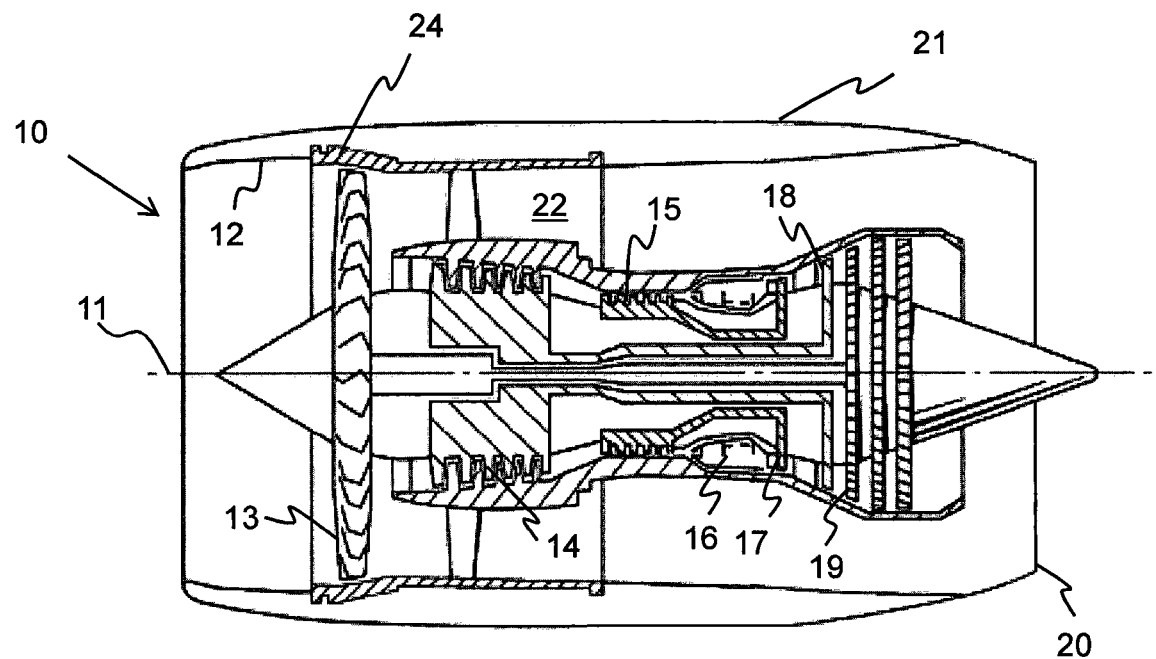
FIG. 1 is a schematic sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20. An annular casing 24 is disposed within the nacelle 21 around the fan 13.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
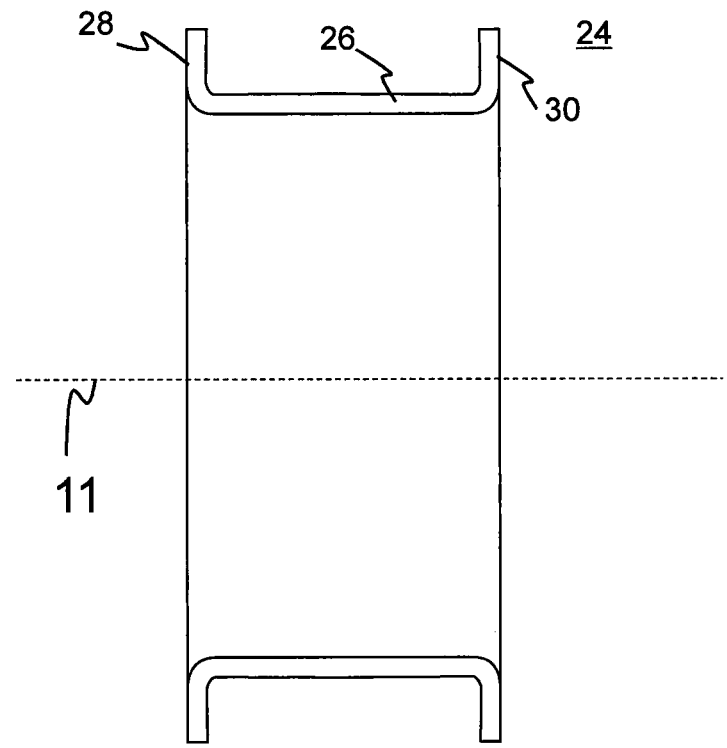
FIG. 2 is a schematic sectional side view of a casing of a gas turbine engine.

As shown in FIG. 2, an example casing 24 comprises an axially extending substantially cylindrical main body 26, coaxial with the principle axis 11 of the engine, with a forward radial flange 28 and rear radial flange 30 integrally extending from forward and aft ends of the main body 26 respectively.

Figure 3:
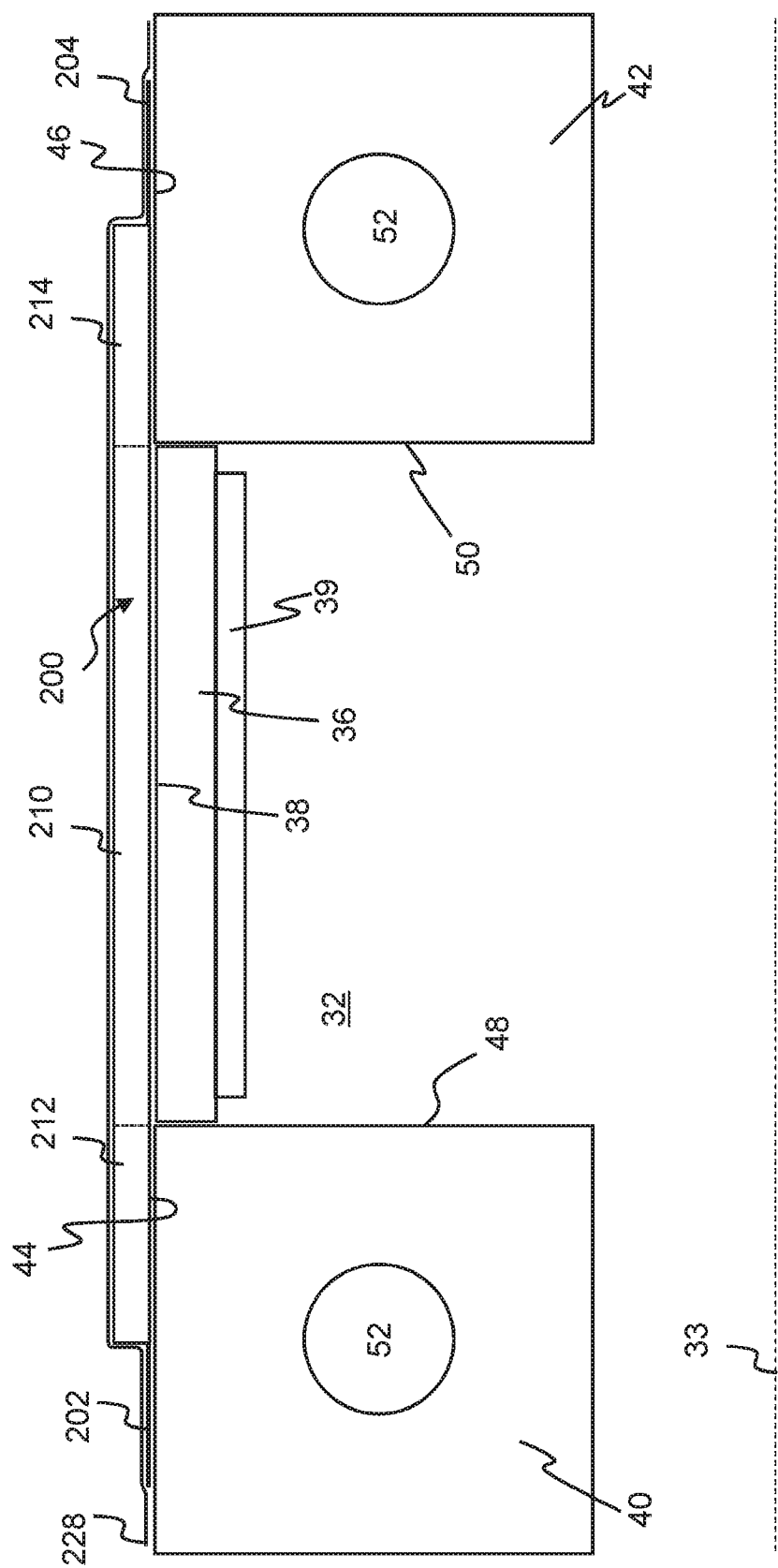
FIG. 3 is a schematic partial cross-sectional view of a pre-form for a composite component on a tool in a lay-up configuration.

FIG. 3 schematically shows part of a tool 32 for forming a component, in this example the casing 24 of FIG. 2, and a pre-form 200 for the component. The tool 32 is generally annular and is oriented around a tool axis 33 corresponding to the principle axis 11 of the casing 24. The tool 32 comprises an annular body portion 36 having an outer and cylindrical body lay-up surface 38 for receiving fibre-reinforcement material during a lay-up operation. In this example, the body portion 36 comprises a plurality of circumferentially extending curved body panels that together define the cylindrical lay-up surface 38. In this example, there are six curved body panels each having an angular extent of 60°. The body portion 36 is provided with a body heater 39 comprising a plurality of body heater elements thermally coupled to the body portion 36, for example, by being secured to the inner surface of the body portion 36 or body panels. Accordingly, the body portion 36, and any fibre-reinforcement material received thereon may be heated, for example during a curing operation. In this example, the body panels are composed of a thermally conductive metal, in particular, stainless steel or aluminium.

Axially adjacent of the body portion 36, on either axial side, there are forward and aft flange-forming assemblies each having a plurality of flange forming portions 40, 42. Each flange-forming portion 40, 42 is in the form of a semi-annular block having an outer flange lay-up surface 44, 46 for receiving fibre-reinforcement material during a lay-up operation, which together form forward and aft cylindrical lay-up surfaces. In this example, each flange-forming portion 40, 42 has an angular extent of 12°, and so each flange-forming assembly comprises 30 flange-forming portions 40, 42.

As shown in FIG. 3, the outer flange lay-up surface 44, 46 of the flange-forming portions 40, 42 extends substantially longitudinally (i.e. parallel with a tool axis 33), so that the lay-up surfaces 44, 46 each form a portion of a cylindrical lay-up surface.

Figure 4:
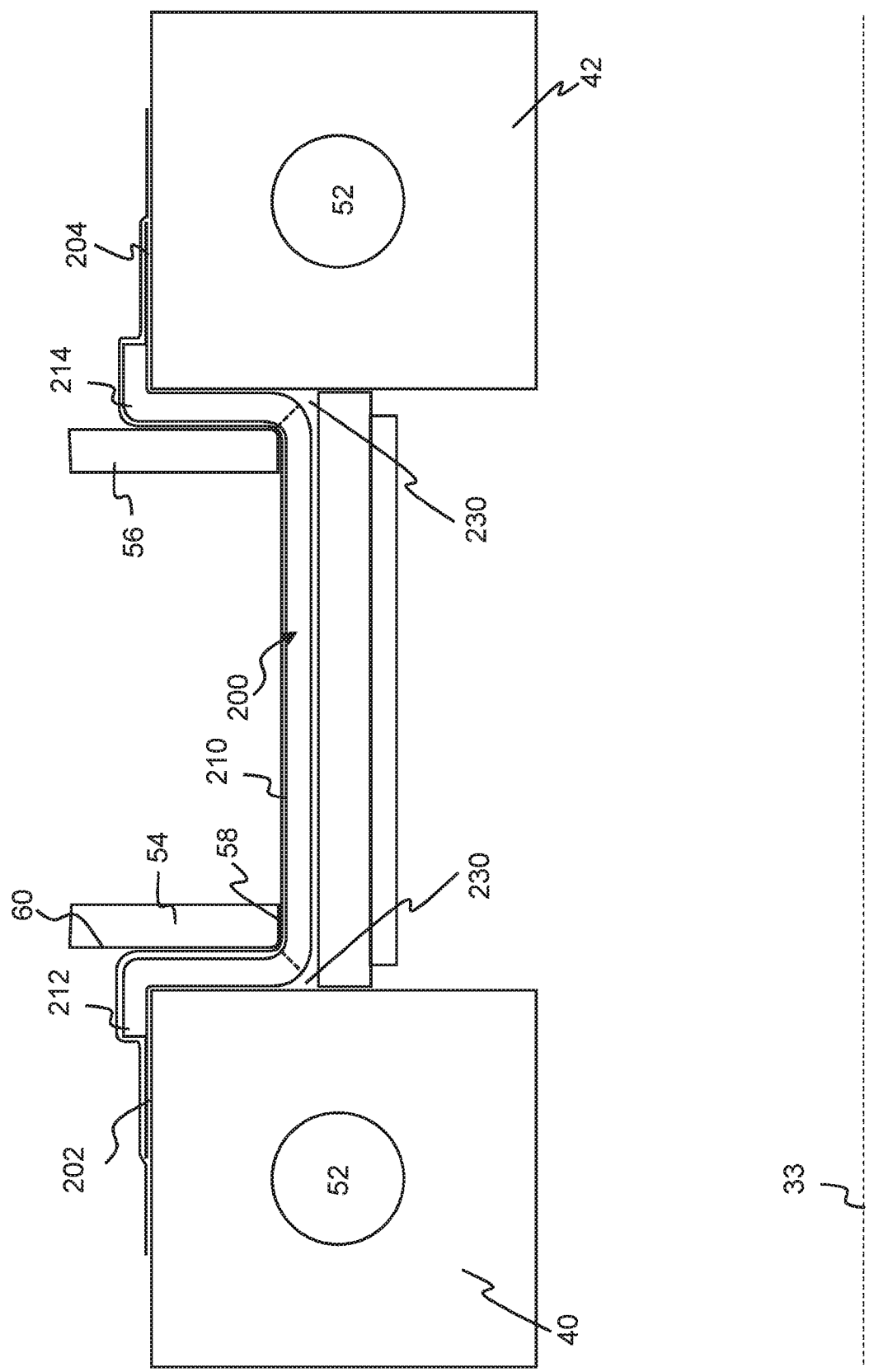
FIG. 4 is a schematic partial cross-sectional view of the pre-form and tool of FIG. 3 in a forming configuration.

Each flange-forming portion 40, 42 is radially moveable relative the main body portion 36 between a lay-up configuration (FIG. 3) and a forming configuration (FIG. 4). In the lay-up configuration, the lay-up surfaces 44, 46 of the flange-forming portions 40, 42 are substantially continuous and contiguous with the lay-up surface 38 of the adjacent body portion 36, such that they together form a substantially continuous lay-up surface of the tool, which in this example is cylindrical. Outward radial movement of the flange-forming portions 40, 42 relative the body portion 36 to the forming configuration causes the lay-up surfaces 44, 46 to be disposed radially-outwardly of the lay-up surface 38 of the body portion 36, so that radially-extending forward and aft side surfaces 48, 50 of the flange-forming portions 40, 42 extend between the lay-up surfaces 38, 44, 46 of the body portion and flange-forming portions respectively.

Each flange-forming portion 40, 42 has an embedded flange heater 52 therewithin, so that the flange-forming portion 40, 42, and fibre-reinforcement material received thereon, may be heated during a forming or curing operation. For example, the heater element 52 may be received in a cavity of the flange-forming portion. In this example, each flange-forming portion 40, 42 is composed of a thermally conductive metal, in particular, stainless steel or aluminium.

The body heater 39 and flange heaters 52 are coupled to a controller (not shown) for controlling flange forming and curing operations, as will be described below. Similarly, actuators (not shown) for the flange-forming portions 40, 42 are coupled to the controller for controlling their relative movement in a flange forming operation.

The body portion 36 and flange-forming portions 40, 42 may be supported on a support structure (not shown), and the flange-forming portions 40, 42 may be radially moveable relative the support structure, as will be described below, in order to move relative the body portion 36.

In other examples, the tool may comprise further portions axially adjacent the flange-forming portions 40, 42, which may be referred to as continuation portions. For example, there may be forward and aft continuation portions on the opposite side of each flange-forming portion or assembly from the body portion, each having radially outer lay-up surfaces for receiving fibre-reinforcement material during a lay-up operation. Such lay-up surfaces may be continuous and contiguous with the lay-up surfaces 44, 46 of the flange-forming portions in the lay-up configuration, such that the lay-up surfaces of the continuation portions form part of the continuous lay-up surface of the tool 32. Such continuation portions may be supported on the same support structure as the body portion 36 and flange-forming portions 40, 42.

As shown in FIG. 4, the tool 32 further comprises forward and aft flange support portions 54, 56 which can be positioned radially outwardly of the body portion (and a pre-form received thereon) and opposing the flange-forming portions 40, 42 in the forming configuration, so as to provide a counteracting support surface for the formation of a flange, as will be described in detail below. In this example, there are a plurality of forward and aft flange support portions 54, 56, angularly spaced around the tool 32 and supported on a counteracting support structure (not shown) removably attachable to a main support structure of the tool. The flange support portions may be removably attachable to the counteracting support structure.

The flange support portions 54, 56 each have a radially inner surface 58 for resting on a substantially-cylindrical region or transition region of a pre-form or component in use, and a radially-extending and substantially planar flange-support surface 60, which is normal to the axis 33 and configured to oppose the side surfaces 48, 50 of the flange-forming portions 40, 42. There is a circumferentially-extending transition curve between the inner surface 58 and the flange-support surface 60. The transition curve may have a relatively low curvature so that, in use, there is a continuous bend between a body region and flange region of the pre-form and formed component. Accordingly, the flange support portions 54, 56 are configured to define the shape of a radial flange during a forming operation, in conjunction with the flange-forming portions. In other examples, there may be a relatively high curvature or substantially square transition between the inner surface 58 and flange-support surface 60 of the flange-support portions 54, 56.

Further, in other examples, the flange support portions 54, 56 may be provided with integral or attached heaters or heating elements for heating the flange-support portions 54, 56, and thereby the flange regions of a pre-form, during a forming operation.

Figure 5:
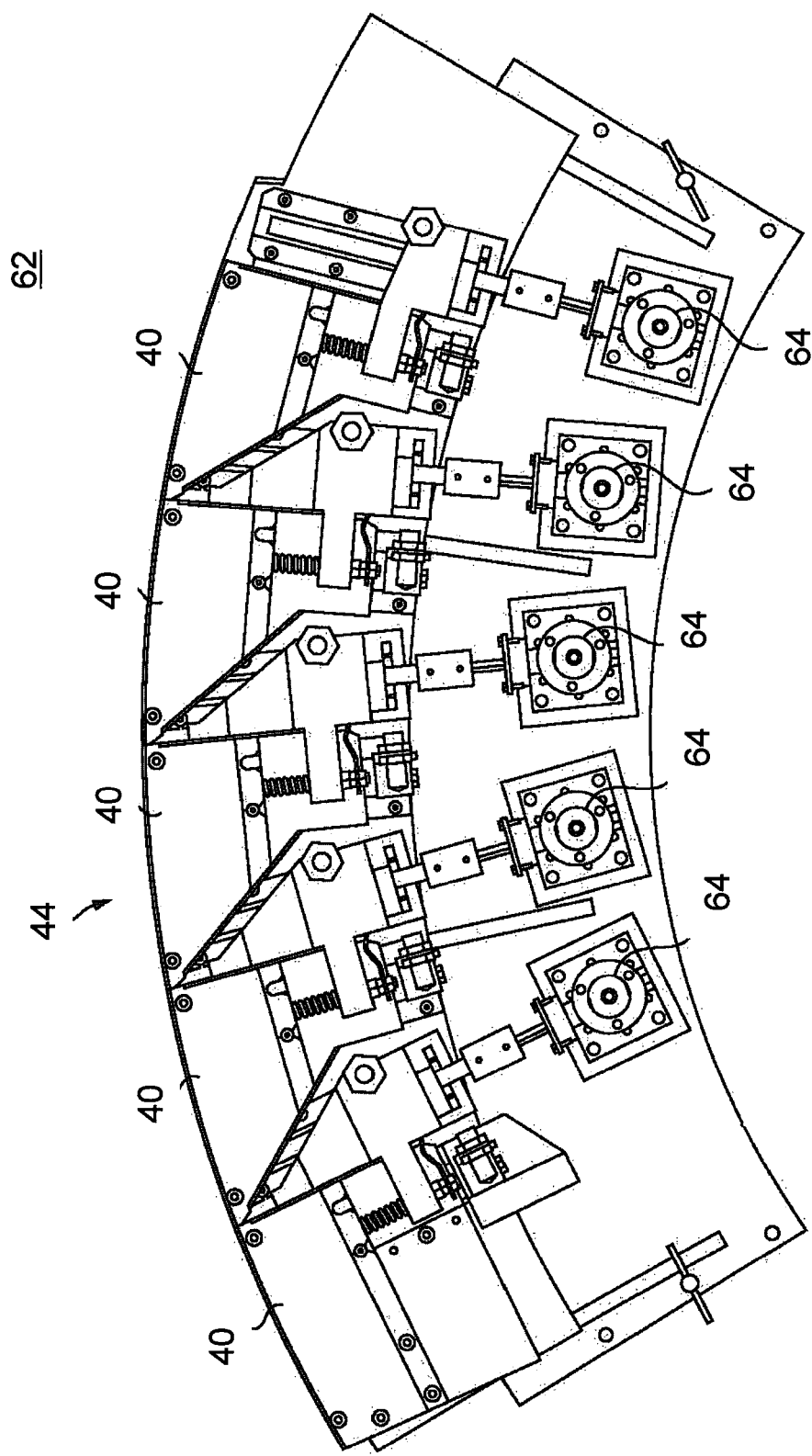
FIG. 5 is a schematic partial cross-sectional view of a forming portion of a tool.

FIG. 5 shows a portion of an actuation mechanism 62 corresponding to five of the forward flange-forming portions 40, but is equally representative of an actuation mechanism for the aft flange-forming portions 42. For each flange-forming portion 40, the actuation mechanism comprises a linear motor 64 mounted to the tool 32 and coupled to the controller for controlling linear radial movement of the flange-forming portion 40 between the lay-up and forming configurations.

Figure 6:
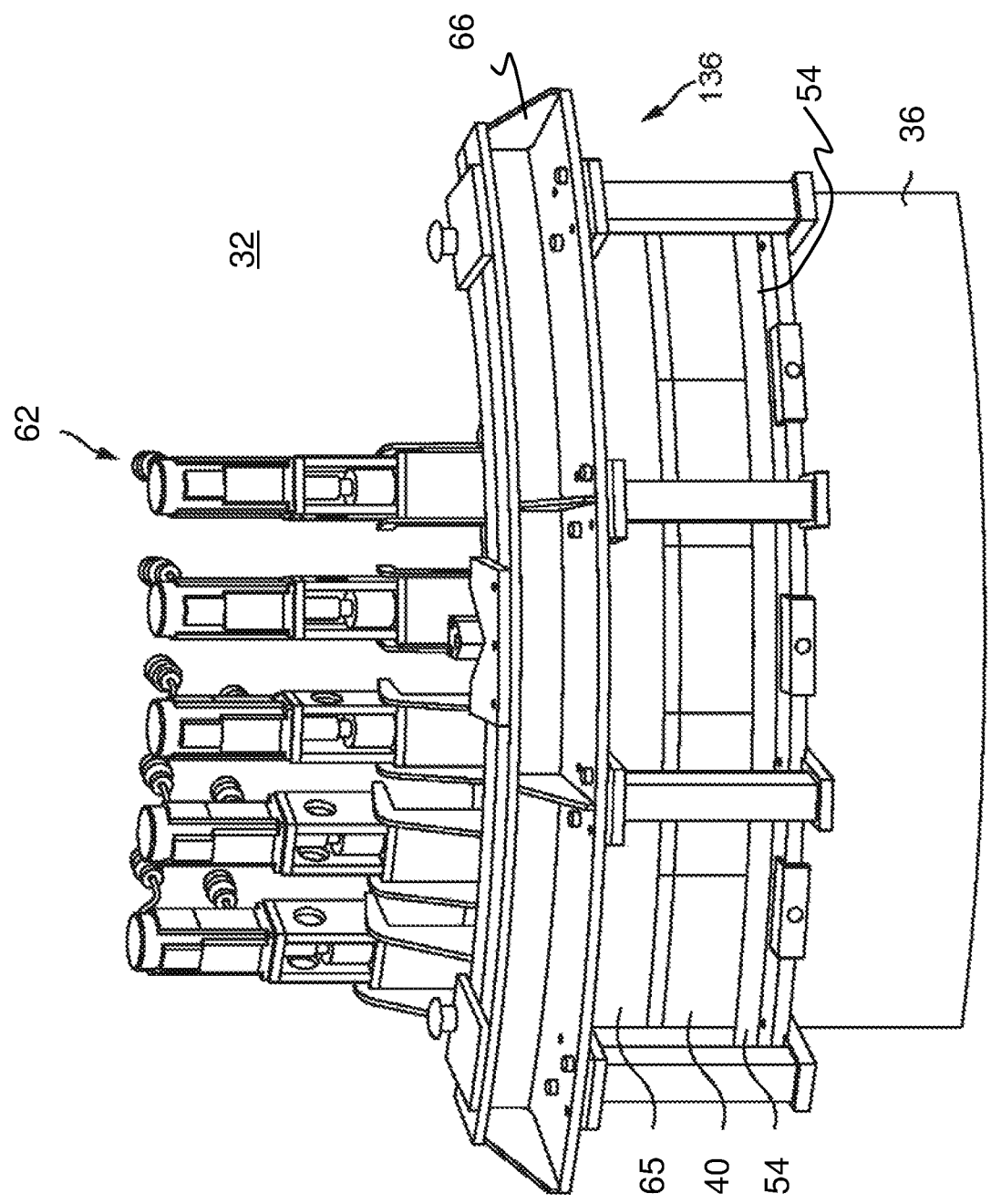
FIG. 6 is a schematic partial perspective view of the tool of FIG. 5.

FIG. 6 shows a portion of the tool 32 corresponding to one sixth of the full annulus, and in particular shows an example arrangement of the tool 32 including the body portion 36, the forward flange-forming portions 40, and a forward continuation portion 65 axially forward of the flange-forming portions 40. Only a forward portion of the tool 32 is shown, and so the aft flange-forming portions adjacent the body portion 36 are not shown. FIG. 6 shows an example arrangement of a flange support structure 66 supporting the flange support portions 54 described above. FIG. 6 also shows a portion of the actuation mechanism 62 for moving the forward flange forming portions 40, as described above.

Methods of manufacturing a composite component using the tool 32 will now be described, by way of example, with respect to FIGS. 3-8.

The tool is oriented on a support surface, such as a floor, so that its axis 33 extends vertically. The tool 32 is prepared for a lay-up operation by detaching the flange support structure 66, if attached, and by controlling the actuation mechanism 62 to return the plurality of flange-forming portions 40, 42 to the lay-up configuration. Accordingly, a continuous lay-up surface is defined on the tool 32 by the radially outer surfaces of the body portion 36, the forward and aft flange-forming portions 40, 42 (and, in other examples, any continuation portions), and is accessible from a radially-outer position.

A lay-up operation is conducted in which unidirectional tapes of pre-impregnated fibre-reinforcement material are applied to the continuous lay-up surface in successive layers or plies using an automatic tape laying (ATL) apparatus, thereby forming a substantially cylindrical composite pre-form 200 on the tool 32.

The fibre-reinforcement material is applied to the tool to provide a pre-form 200 having a body region 210 and axially-adjacent forward and aft flange regions 212, 214 on either axial side of the body region 210, so that the body region 210 is contiguous and continuous with each of the flange regions 212, 214 (FIG. 3). The fibre-reinforcement tapes are applied around the annulus of the tool to form successive cylindrical ply layers. The ply layers may have orientations of, for example, 0° (i.e. axially aligned), ±60°, and 90° (i.e. lateral).

Figure 7:
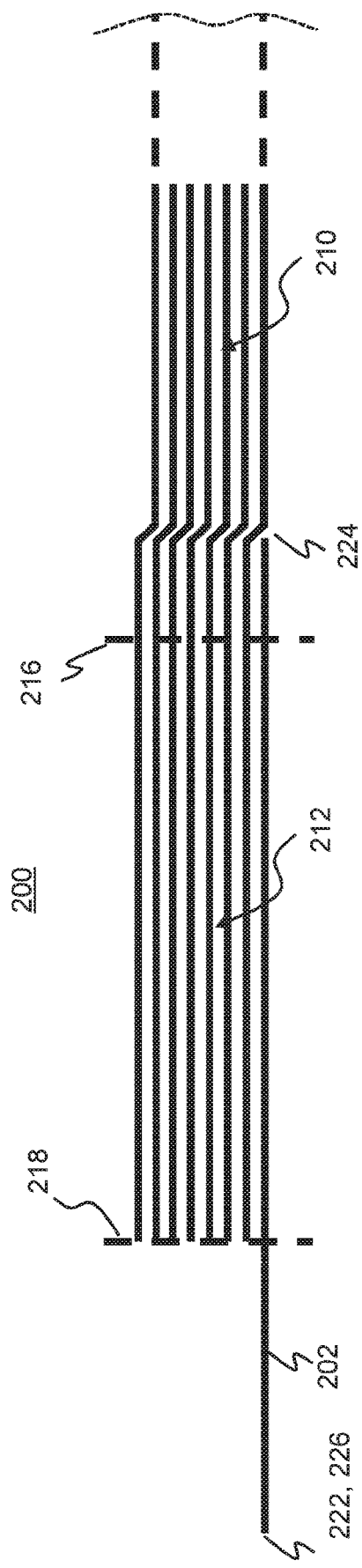
FIG. 7 is a schematic partial cross-sectional view of the pre-form of FIG. 3.

However, in this particular example, fibre-reinforcement is first applied to form forward and aft trailing plies 202, 204, as shown in FIGS. 3, 4, and in more detail in FIG. 7.

FIG. 7 shows a forward portion of the pre-form 200 in cross-section, including part of the body region 210, the forward flange region 212, and a trailing ply 202.

There is a boundary 216 between the body region 210 and the forward flange region 212, which corresponds to where the forward flange region 212 deflects or deforms away from the body region during a forming operation. The location of the boundary 216 may therefore be determined by reference to the boundary between the underlying body portion 36 and forward flange-forming portion 40, for example it may be considered to lie directly over this boundary. Nevertheless, it will be appreciated that since the body region and flange regions of the pre-form are substantially continuous with each other, and since there may be a continuous bend between the main body and flange of the formed component, the boundary may be considered to lie in a transition region overlapping with the body and flange regions 210, 212 of the pre-form.

As shown in simplified form in FIG. 7, a plurality of plies from the body region 210 extend into and through the forward flange region 212 and terminate at an outer end 218 of the forward flange region 212 (i.e. the end farthest from the body region 210).

Further, a trailing ply 202 is provided which in this example forms part of the lowermost ply layer of the pre-form 200. The trailing ply 202 extends longitudinally between an outer ply end 222 and an inner ply end 224. In this example, the trailing ply 202 longitudinally extends from the inner ply end 224 to beyond the outer end 218 of the forward flange region 212 so that the trailing ply projects beyond the forward flange region 212. In this example, the outer ply end 222 of the forward trailing ply 202 defines a forward longitudinal end 226 of the pre-form. A corresponding aft longitudinal end of the pre-form is defined by an outer ply end of a corresponding aft trailing ply 204. It will be appreciated that in other examples, the or each trailing ply may terminate substantially in line with the outer end of the corresponding flange region.

The inner ply end 224 terminates partway into the body region 210, such that the inner ply end 224 is separated from the opposing end 226 of the pre-form. In particular, in this example, the desired length of the forward flange in the finished component is 150 mm, the longitudinal length of the forward flange region 212 is 200 mm (in order to accommodate for Z-shape forming, as will be described below), the longitudinal length of the trailing ply is 300 mm, and the trailing ply 202 longitudinally extends 50 mm beyond the outer end 218 of the forward flange region 212, and longitudinally extends 50 mm into the body region 210 (i.e. beyond the boundary 216). The body region has an axial extent of 1500 mm.

In other examples, the inner ply end 222 may terminate in the flange region 212, for example it may terminate substantially at the boundary 216, or at an intermediate longitudinal point in the flange region 210.

In this example, the lay-up operation is controlled so that fibre-reinforcement tapes are first applied to form the forward and aft trailing plies 202, 204. Subsequently, a plurality of plies are applied to form the body region 210, and the forward and aft flange regions 212, 214. As shown in FIG. 7, the plurality of plies are applied over the inner end 224 of the trailing ply 202, and thereby a minor step may be formed in the pre-form. Accordingly, the trailing ply 202 only forms part of the base ply layer in the pre-form as a whole.

Although a thickness of only seven plies (excluding the trailing ply 202) is shown in FIG. 7, it will be appreciated that the drawing is illustrative only, and the pre-form may comprise a greater (or lesser) number of plies.

In this particular example, the forward and aft trailing plies 202, 204 are each formed of a single ply of fibre-reinforcement material, which corresponds to a thickness of approximately 0.25 mm, and there is a thickness of twenty (20) upper plies in the body region 210 and the forward and aft flange regions 212, 214, corresponding to a thickness of approximately 5 mm. It will be appreciated that this is a simplified example, and that the thickness and number of plies may vary along the longitudinal length of the pre-form, and there may be step changes in thickness or gradual reductions in thickness over a longitudinal length. For example, there may be between 10 and 40 plies, or more.

In this particular example, the forward and aft trailing plies 202, 204 are applied with an orientation of 0°, so that the ply orientation is aligned with the axial or longitudinal direction of the pre-form 200, and thereby the component to be formed. The upper plies (i.e. those applied to form the body region 210 and flange regions 212, 214) in this example are applied in a plurality of different orientations, as is known in the art for obtaining desirable structural properties in the final component. In particular, in this example there are upper plies having each of +60°, −60° and 90° orientations with respect to the tool axis 33. There may also be upper plies having 0° orientations. In other examples, other lay-up techniques may be used, such as AFP (Automatic Fibre Placement), or hand lay-up.

As shown in FIG. 3, the fibre-reinforcement material is applied so that the forward and aft flange regions 212, 214 extend part-way over the lay-up surfaces 44, 46 of the respective flange-forming portions 40, 42, and the forward and aft trailing plies 202, 204 are applied so that they are also received on the lay-up surfaces 44, 46. In other examples, the flange regions 212, 214 and/or the trailing plies 202, 204 may extend partway onto respective continuation portions on the opposite side of the flange-forming portions 40, 42 from the body portion 36, as described above.

As shown in FIG. 3, after the lay-up operation is complete, a flexible membrane 228 (i.e. a vacuum bag), for example a sheet of silicone rubber, is applied over the pre-form 200 on the tool 32 and sealed at longitudinally forward and aft ends (i.e. outside the longitudinal ends of the pre-form) so that the pre-form 200 is in a sealed environment between the tool 32 and the flexible membrane 228. For example, the flexible membrane 228 may be sealed using adhesive tape.

Vacuum tubes (not shown) are extended through the flexible membrane 228 to the space enclosed between the tool 32 and the membrane 228, and a vacuum source such as a vacuum pump is applied to the vacuum tubes to create a partial vacuum in the space occupied by the pre-form 200. In this example, a partial vacuum is formed so that an unbalanced pressure force from the ambient atmosphere is applied through the vacuum bag onto the pre-form 200.

The forming operation is initiated by the controller causing the heating apparatus (i.e. the body heater 39 and the flange heaters 52) to heat the pre-form 200 to a threshold forming temperature, which in this example is 80° C. In this example, the controller controls the heaters so that the flange regions 212, 214 reach the threshold forming temperature, but a substantial portion of the body region 210 does not, for example by only activating the flange heaters 52, or by controlling the body heater 39 to heat the body region 210 to a lower temperature than the flange regions 212, 214.

When the flange regions of the pre-form have reached the threshold forming temperature, the controller causes the actuation mechanism 62 to drive the flange-forming portions 40, 42 radially outwardly from the lay-up configuration (FIG. 3) to the forming configuration (FIG. 4). As the flange-forming portions 40, 42 move radially outwardly, the lowest ply layer of the pre-form 200 adjacent the flange-forming portions 40, 42 is caused to slide over the flange-forming portion. In this example, the forward and aft trailing plies 202, 204 form the lowest ply layer over the flange-forming portions 40, 42, and so these plies are caused to slide relative the flange-forming portions 40, 42. In other examples, trailing plies may only account for a part of the lowest ply layer in the pre-form adjacent the flange-forming portions 40, 42.

The movement of the flange-forming portions 40, 42 causes the flange regions 212, 214 to plastically deform around and between the side surfaces 48, 50 of the flange-forming portions 40, 42 and the flange support surfaces 60 of the counteracting flange support portions 54 to form the forward and aft radial flanges of the component. In contrast, the body region 210 of the pre-form remains substantially in place against the body portion 36 of the tool 32. A transition region of the pre-form 200 between or overlapping each respective flange region 212, 214 and the body region 210 is pulled away from the portion of the lay-up surface 38 of the body region adjacent the respective flange-forming portion 40, 42 to form a transition bend in the pre-form as described below.

The sliding movement of the lowest ply layer of the pre-form 200 relative the adjacent flange-forming portions 40, 42 is resisted by friction or shear viscous forces acting between the lowest ply layer and the external surfaces of the flange-forming portions 40, 42 (or a release liner disposed thereon, as described below). The shear viscous force is proportional to the area of the lowest ply layer that slides relative to the respective flange-forming portion 40, 42. The shear viscous force may also depend on (and increase with) a pressure force applied onto the pre-form through the flexible membrane.

The friction force or shear viscous force is applied on the lowest ply layer in the direction of relative sliding movement of the flange-forming portion 40, 42 (i.e. so as to resist sliding movement). Accordingly, the shear viscous force results in tension in the lowest ply layer.

The plies in the pre-form are in frictional contact with each other, and so the tension force in the lowest ply layer is reacted throughout the thickness of the pre-form so that there is a resultant tension force in the pre-form. As shown in FIG. 4, this tension force tends to draw or pull the flange regions 212, 214 of the ply along with the flange-forming portions 40, 42 so that the flange-regions 212, 214 follow the shortest path from the body region 210 to the of the pre-form to the end 226 of the pre-form. This results in the flange regions 212, 214 being pressed against the counteracting flange support surface 60, and the pre-form being lifted away from the junctions between the lay-up surface 38 of the body portion 36 and the respective side surfaces 48, 50 of the flange-forming portions 40, 42.

By way of comparison, in the absence of significant tension in the pre-form, the pre-form may expand into the void 230 (FIG. 4) formed between each counteracting support surface 60 and the junction between the body portion 36 and respective flange-forming portion 40, 42 of the tool 32. This may be particularly problematic for larger voids caused by a low curvature transition region between the body and flange (for example, as may be defined by the counteracting flange support surface 60), where gravity effects are important, or where there is a large pressure force applied through the flexible membrane 228, but may still affect high curvature or square transitions.

The tension force in the pre-form may therefore help to avoid forming defects in the flange region 212, 214, such as wrinkling, which may otherwise occur as the flange is formed.

Further, it will be appreciated that the path length around the transition region between the body and flange regions will be longest for the lowest ply layer, and reduces for upper layers of the pre-form. Nevertheless, the opposite is true for the region of the pre-form extending around the edge of the respective flange-forming portion 40, 42 between the side surface 48, 50 and the lay-up surface 44, 46, and so the path length of each ply equalises and any loss in tension owing to differing path length is minimised. Nevertheless, the tension force imparted in the pre-form helps to reduce forming defects in these regions, for example, by promoting relative sliding of the plies to reduce bunching in these regions.

Since the trailing plies 202, 204 form the lowest ply layer in the regions of the pre-form adjacent the flange-forming portions 40, 42 (i.e. the flange-forming regions 212, 214), the frictional resistance between the trailing plies 202, 204 and the flange-forming portions 40, 42 during sliding determines the tension force that results in the pre-form. For example, the tension force can be increased by extending the trailing plies 202, 204 to achieve an increased area of frictional contact between the trailing plies 202, 204 and the flange-forming portions 40, 42. As shown in FIG. 3, in this example the trailing plies 202, 204 extend beyond the outer end 218 of the respective flange regions 212, 214. In particular, the trailing plies 202, 204 extend approximately 50 mm beyond the outer end 218 of the flange regions 212, 214, whereas the longitudinal extent of the flange regions 212, 214 is approximately 200 mm. Accordingly, the trailing plies 202, 204 have a longitudinal extent beyond the respective flange regions of approximately 25% of the flange region. In other examples, the trailing plies may have a greater or lesser extent (both absolute and in proportion to the flange regions), and may be coterminous with the outer end 218 of the flange region. The flange regions 212, 214 are ultimately trimmed down to approximately 150 mm (as described below).

In this example, the trailing plies 202, 204 terminate at respective inner ply ends 224 within the flange region 212, 214 or partway into the body region 210 of the pre-form, in particular, approximately 50 mm into the body region 210. The tension force on each trailing ply 202, 204 may cause the trailing ply 202, 204 to slide relative the adjacent ply (or plies) of the pre-form so that the inner ply end 224 slides within the pre-form relative the adjacent ply. Accordingly, the trailing ply 202, 204 may undergo translational movement within the pre-form during forming (as opposed to plies sliding relative one another owing to curved regions, or by virtue of ply lengthening under tension). For example, the trailing ply may undergo translational movement of approximately 3 mm.

In this example, the trailing plies 202, 204 have an orientation of 0° (i.e. axial alignment) with respect to the longitudinal axis 33 of the tool 32. As described above, the deformation of the flange regions 212, 214 of the pre-form during the flange-forming operation is influenced by the sliding movement of the trailing ply (which forms the lowest ply layer in the flange regions 212, 214) and the resulting tension force reacted within the stack of plies. As will be appreciated, the tension force applied on the lowest ply layer acts in a plane extending through the tool axis 33 (for example, axially on regions against the lay-up surfaces 44, 46 of the flange-forming portions 40, 42, and radially on regions against the side surfaces 48, 50 of the flange-forming portions 40, 42). The applicant has found that plies may respond to a tension force that is not aligned with the orientation of the ply by deforming, extending or translating towards the direction of the tension force, which have been termed steering effects of the ply. Such steering effects may be result in undesirable forming effects, such as ply wrinkling. Since the trailing plies have an orientation of 0° with respect to the axis 33 of the tool 32, steering effects of the trailing ply are avoided. In other examples, there may be a single trailing ply extending between the two longitudinal ends of the pre-form 200.

Once the flange-forming operation is complete (FIG. 4), the controller initiates a curing operation and causes the heating apparatus to heat the pre-form 200, including the formed flange, to at least a threshold curing temperature, which in this example is 135° C. The controller also controls the vacuum source so that an unbalanced pressure force is applied to the pre-form through the flexible membrane 228.

After a curing period of 6 hours, the controller turns off the heating apparatus and the cured casing 24 is allowed to cool on the tool 32. The flange support structure 66 is separated and the flexible membrane 228 and associated equipment is removed from the cured component. The flange-forming portions 40, 42 are retracted to the lay-up configuration, and the cured casing 24 is removed from the tool 32.

The casing 24 is then trimmed to remove the trailing plies 202, 204 and optionally any undesired portion of the formed flange regions 212, 214. In this example, the portion of the formed flange regions 212, 214 extending axially is removed, together with the associated bend from the radial portion, to leave two radially extending flanges.

Figure 8:
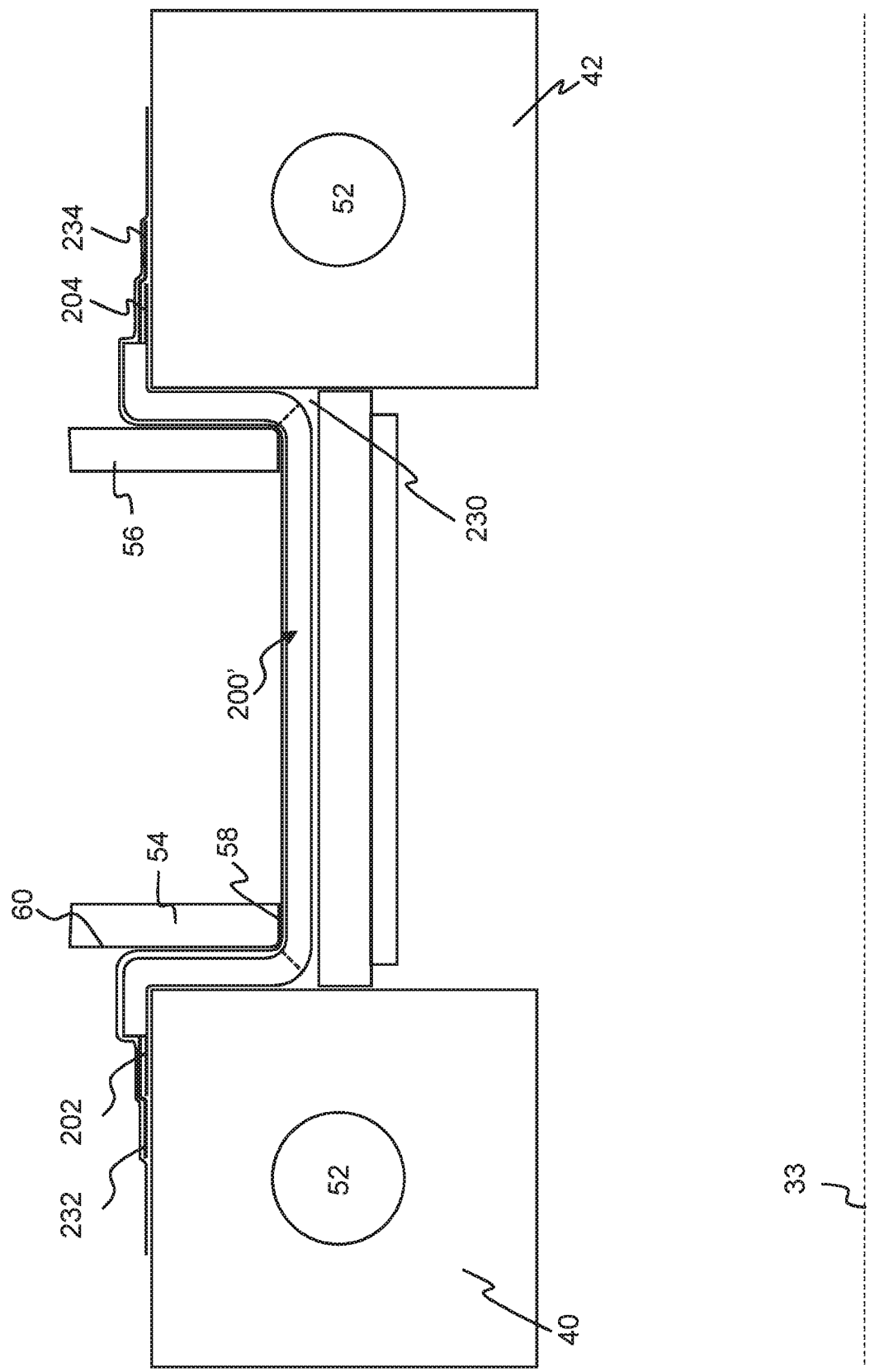
FIG. 8 is a schematic partial cross-sectional view of a further pre-form and tool in a forming configuration.

FIG. 8 shows a further example of a pre-form 200' on the tool 32, in the forming configuration of the tool. The pre-form 200' of this example differs from the pre-form 200 described above in that there are two trailing plies at each longitudinal end of the pre-form 200.

In particular, at each end, a first trailing ply 202, 204 extends beyond the outer end 218 of the respective flange region 212, 214, for example by 50 mm. The first trailing ply 202, 204 at least partially forms the lowest ply layer of the flange region 212, 214, as described above.

In addition, a second trailing ply 232, 234 extends between the respective longitudinal end of the pre-form 226, over the first trailing ply and terminates at an inner ply end within the respective flange region 212, 214 or partway into the body region 210. In other examples, the second trailing ply 232, 234 may extend towards and may terminate at the opposing longitudinal end of the pre-form.

In this example, each second trailing ply 232, 234 forms an intermediate ply layer in the respective flange region (i.e. a layer between radially inner and radially outer plies in the stack), but in other examples the second trailing ply may form the radially outer ply in the respective flange region.

Since each second trailing ply extends beyond the outer ply end of the respective first trailing ply 202, 204, the second trailing ply 232, 234 is caused to slide relative the respective flange-forming portion 40, 42 during a flange-forming operation, as described above. Accordingly, this results in a tension force in the second trailing ply 232 which is reacted in the adjacent plies within the pre-form, thereby helping to form the flange during the flange-forming operation, as described above.

In yet further examples, there may be more than two trailing plies overlapping one another and arranged for sliding frictional contact with the flange-forming portion (or a continuation portion of the tool) during a flange-forming operation.

Although examples of the invention have been described with respect to the manufacture of a casing for a gas turbine, it will be appreciated that the disclosure is equally applicable to any structure having a flange or other portion diverting from a main body portion at an end of the component, and which is formed by sliding of a pre-form relative a portion of a tool during a forming operation. In particular, the invention is applicable to both annular, and non-annular structures. Any references in the above disclosure to axial notation may be interpreted as referring to a longitudinal direction in the context of a non-annular component. Further, references to a radial direction may be interpreted as a direction perpendicular to a longitudinal direction in the context of a non-annular component.

One example of a non-annular structure is a spar for a wing. Spars for wings generally comprise a central main body and two side flanges.

It will be appreciated that references to the thickness of a region of a pre-form may relate to an average thickness over the region of the pre-form.

It will be appreciated that either one of the main body portion and the flange-forming portions may move relative to a support structure during a forming operation. For example, a main body portion and counteracting flange support structure may be actuated to move relative a support structure to which a flange-forming portion is fixed, and a pre-form may consequently be drawn over the flange-forming portion.

Although an example of the invention has been described with reference to Automatic Tape Laying (ATL), it will be appreciated that other lay-up operations may be used, such as Automatic Fibre Placement (AFP), automatic filament winding, and manual lay-up.

Although an example of the invention has been described in which fibre-reinforcement material is applied onto, and is in contact with, a lay-up surface of a tool, it will be appreciated that a release liner or other liner may be applied onto the lay-up surface, and fibre-reinforcement material may be applied onto the release liner. Nevertheless, there may be relative sliding between the fibre-reinforcement material and the lay-up surface of the tool during forming, for example, the fibre reinforcement material may slide relative the release liner which may be fixed to the tool.

It will be understood that the invention is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a composite component comprising a main body and an integral flange, the method comprising:
applying fibre-reinforcement material on a tool having a main body portion and a flange-forming portion to provide a pre-form comprising:

a body region and a longitudinally adjacent flange region contiguous with the body region, the body region corresponding to the main body of the composite component and the flange region corresponding to the integral flange of the composite component;

wherein the pre-form extends longitudinally between two longitudinal ends; and wherein a trailing ply of the pre-form extends longitudinally between the longitudinal end closest to the flange region and an inner ply end located in the flange region or partway into the body region, the trailing ply comprising a layer of fibre reinforcement tape;

causing relative movement between the flange-forming portion and the main body portion so that the flange region of the pre-form deforms to form the integral flange of the composite component;

wherein the relative movement between the flange-forming portion and the main body portion causes sliding movement between the trailing ply and the flange-forming portion and translational movement of the trailing ply within the pre-form during forming, thereby causing a tension force in at least the flange region of the pre-form during forming of the integral flange.

2. A method according to claim 1, wherein the fibre-reinforcement material is applied so that the trailing ply has an orientation aligned with a longitudinal direction.

3. A method according to claim 1, wherein the fibre-reinforcement material is applied so that the trailing ply has an orientation perpendicular to a boundary between the body region and the flange region of the pre-form.

4. A method according to claim 1, wherein the fibre-reinforcement material is applied so that the trailing ply has an orientation perpendicular to a boundary between the main body portion and the flange-forming portion of the tool.

5. A method according to claim 1, wherein the flange region comprises a plurality of plies of fibre-reinforcement material arranged in ply layers, a base ply layer of which is a closest of the plurality of plies to the tool, and wherein the fibre- reinforcement material is applied so that the trailing ply at least partly forms the base ply layer.

6. A method according to claim 1, wherein the flange region comprises a plurality of plies of fibre-reinforcement material arranged in ply layers, and wherein the fibre-reinforcement material is applied so that the trailing ply at least partly forms an intermediate ply layer of the flange region or an outermost ply layer of the flange region which is farthest from the tool.

7. A method according to claim 1, wherein the flange region extends from the body region to an opposing outer end, and wherein the trailing ply extends longitudinally from the inner ply end beyond the outer end of the flange region to the respective longitudinal end of the pre-form.

8. A method according to claim 7, wherein a thickness of the pre-form reduces beyond the outer end of the flange region.

9. A method according to claim 7, wherein the trailing ply extends longitudinally at least 20mm beyond the outer end of the flange region.

10. A method according to claim 7, wherein there are at least two trailing plies extending beyond the outer end of the flange region, including a first trailing ply extending a first distance beyond the outer end of the flange region, and a second trailing ply extending a greater second distance beyond the outer end of the flange region and over the first trailing ply to terminate at the respective longitudinal end of the pre-form, such that at least a portion of each trailing ply slides relative the flange-forming portion of the tool during a flange forming operation, each of the at least two trailing plies comprising a layer of fibre reinforcement tape.

11. A method according to claim 7, wherein the method further comprises removing composite material corresponding to the or each trailing ply which extends beyond the outer end of the flange region.

12. A method according to claim 1, wherein the composite component further has a second integral flange, such that the integral flange and the second integral flange are located at opposing longitudinal ends of the composite component, the tool further having a secondary flange-forming portion, and the pre-form further having a secondary flange region and a secondary trailing ply.

13. A method according to claim 1, wherein the or each flange-forming portion of the tool has a lay-up surface that is continuous with a lay-up surface of the main body portion of the tool in a lay-up configuration of the tool, and a side-surface which extends between the lay-up surfaces of the flange-forming portion and main body portion of the tool in a forming configuration of the tool.

14. A method according to claim 1, wherein a direction of relative movement of the flange-forming portion and the main body portion of the tool is parallel to an extent of the integral flange.

15. A method according to claim 1, wherein the composite component is an annular or a partially annular component, wherein the main body portion and the flange-forming portion of the tool are configured for relative radial movement, and wherein the integral flange is radial.

16. A method according to claim 1, wherein the fibre-reinforcement material is applied so that the trailing ply is applied first, before other remaining plies of the fibre-reinforcement material.

17. A method according to claim 1, wherein the flange-forming portion of the tool contacts the trailing ply at the longitudinal end closest to the flange region.

18. A method according to claim 1, wherein the trailing ply extends longitudinally outward beyond longitudinal ends of all other plies of the pre-form.

* * * * *